United States Patent
Lenz, Jr.

[11] Patent Number: 5,911,427
[45] Date of Patent: Jun. 15, 1999

[54] SAIL AND PEDAL POWERED VEHICLE WITH REMOVABLE LATERAL SUPPORT WHEELS

[76] Inventor: Arthur W. Lenz, Jr., 5102 S. 38th St., Omaha, Nebr. 68107

[21] Appl. No.: 08/882,130

[22] Filed: Jun. 25, 1997

Related U.S. Application Data

[63] Continuation-in-part of application No. 08/599,062, filed as application No. PCT/US97/01669, Feb. 6, 1997, abandoned.

[51] Int. Cl.$^6$ ................................................ B62K 13/06
[52] U.S. Cl. ........................ 280/213; 280/282; 280/288.1
[58] Field of Search ................................ 280/288.4, 293, 280/288.1, 213, 214, 282, 203, 7.15, 7.17; D12/306, 303

[56] References Cited

U.S. PATENT DOCUMENTS

| | | | |
|---|---|---|---|
| 609,174 | 8/1898 | Thurston | 280/293 |
| 2,439,755 | 4/1948 | Schwinn | 280/282 |
| 3,986,722 | 10/1976 | Patterson | 280/213 |
| 3,994,508 | 11/1976 | Danner | 280/213 |
| 4,203,500 | 5/1980 | Kamiya | 280/293 |
| 4,332,395 | 6/1982 | Zech | 280/213 |
| 4,408,772 | 10/1983 | Hollwarth | 280/213 |
| 4,708,356 | 11/1987 | Levavi | 280/288.1 |
| 4,735,429 | 4/1988 | Beck | 280/288.4 |
| 5,242,183 | 9/1993 | Oberg et al. | 280/293 |

FOREIGN PATENT DOCUMENTS

| | | | |
|---|---|---|---|
| 2665872 | 2/1992 | France | 280/213 |
| 136069 | 4/1902 | Germany | 280/293 |
| 3345690 | 6/1985 | Germany | 280/282 |
| 4775 | 6/1914 | United Kingdom | 280/293 |

*Primary Examiner*—Kevin Hurley
*Attorney, Agent, or Firm*—Philip J. Lee

[57] ABSTRACT

A vehicle 10 powered by a sail 90 as well as by pedals 66 and 48 comprises a tandem bicycle with a stoker seat 38 in line with and behind a captain seat 32 and a vertical mast 86 stepped between the seats, the sail 90 being attached to and between the mast 86 and a horizontal boom 88 rotatably attached to the mast 86 and controlled by means of a rope and pulley system 115, lateral support of the vehicle 10 being provided by wheels 104 laterally displaced from the centerline of the vehicle 10 on each side of the vehicle 10, the seats 32 and 38 having seat backs 34 and 40 and located far enough behind the pedals 48 and 66 to provide a recumbent or semi-recumbent position for the operators.

16 Claims, 5 Drawing Sheets

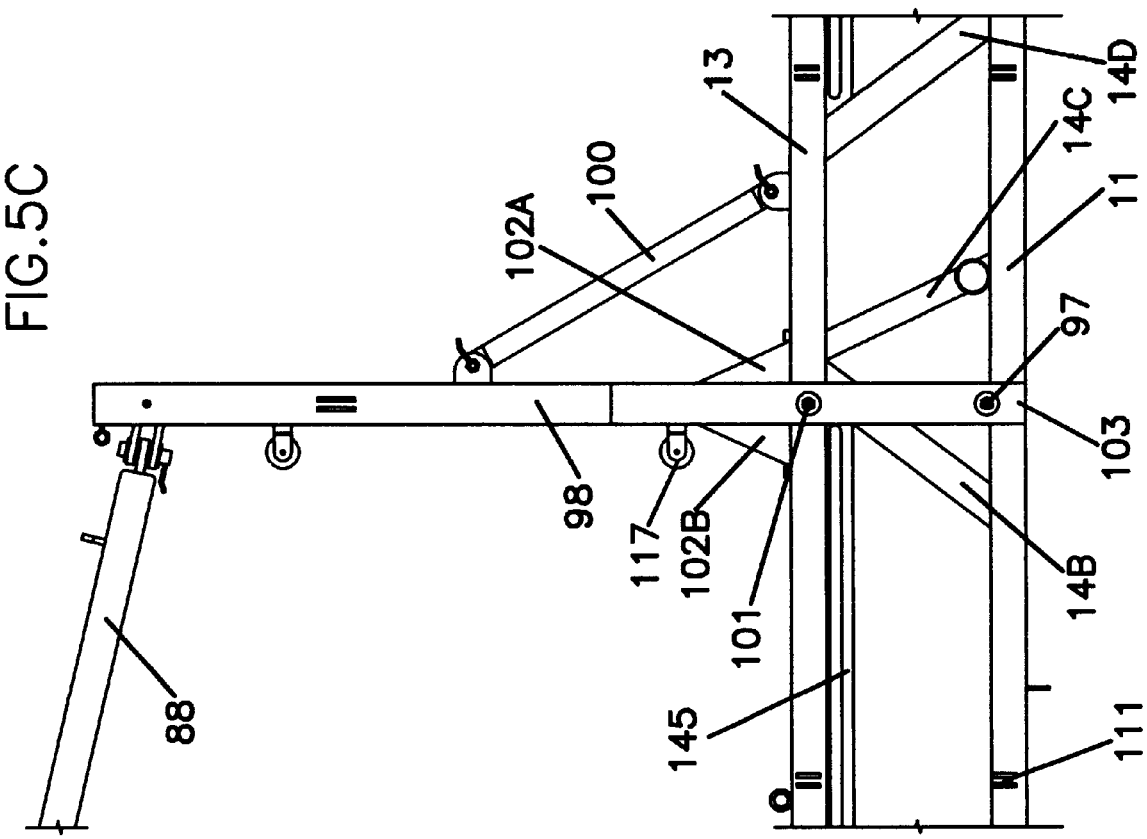
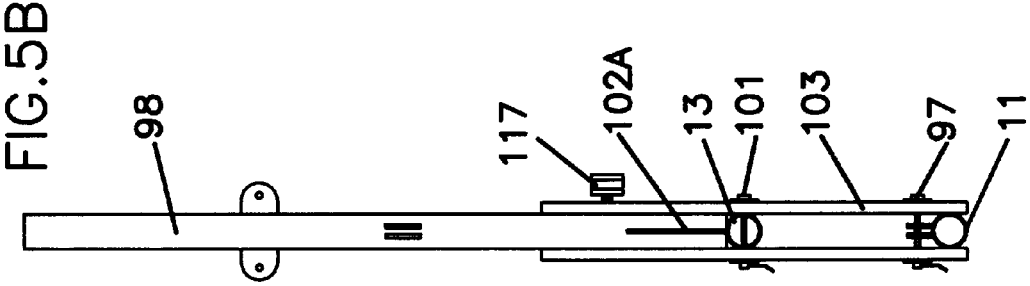
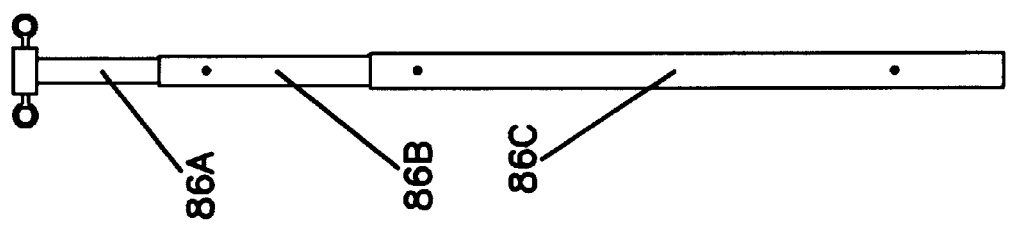

SAIL AND PEDAL POWERED VEHICLE WITH REMOVABLE LATERAL SUPPORT WHEELS

This application is a continuation-in-part of copending application(s) application number 08/599,062 filed on Feb. 9, 1996 which is a 371 of International Application. PCT/US97/01669 filed on Feb. 6, 1997 and which designated the U.S.

TECHNICAL FIELD

The present invention relates generally to vehicles powered by sail and more particularly to a new and improved vehicle powered alternatively or concurrently by sail or pedal power.

BACKGROUND ART

Numerous attempts have been made to attach sail assemblies to bicycles for the purpose of achieving a useful vehicle generating propulsion from the wind as well as from pedal power. The difficulties commonly encountered by such designs include the inherent lateral instability of a bicycle as well as the need to control the sail assembly while also controlling the direction of the vehicle, i.e. by steering. It is necessary to control the angular rotation of the sail relative to the longitudinal axis of the vehicle for maximum drive from the sail, a process known as trimming the sail. In a conventional sailboard both hands are commonly used to control the sail and steering is done by the manipulation of the position of the sail in relation to the underwater foils. In the case of a one person sailboat, steering requires one hand on a tiller and occasionally both hands are required to participate in the control of the sail which is ordinarily controlled by means of a rope sheeting arrangement. An example of prior attempt at a sail-powered bicycle is shown in U.S. Pat. No. 4,738,460 to Alexander which describes a means for mounting a sail on the rider of a bicycle; the sail angle being controlled by a sail lever requiring the operator to devote one hand to the constant operation of the sail and attempt to steer solely with the other hand. Similarly, U.S. Pat. No. 3,986,722 to Patterson and U.S. Pat. No. 4,557,495 to Kindermann both require the operator to use one hand to constantly attend to the trim of the sail. Another attempt to solve this problem is shown in U.S. Pat. No. 4,735,429 to Beck which shows a sail mounted behind the seat of a conventional bicycle which allows no manual control of the sail, the sail being basically controlled by a spring loaded mechanism constantly urging the sail back to a central position with respect to the boom. Similarly, U.S. Pat. No. 3,994,508 to Danner describes a method of controlling the sail for mounting on a bicycle which is essentially a flexible but rigidly positioned boom relying on the flexibility and resilience of the boom to control the sail trim. All of these inventions require the operator to substantially constantly attempt to steer with one hand which is difficult, frequently dangerous and prevents the operator from operating two hand brakes when necessary. In addition, none of the designs provide any righting moment which is necessary to counteract the lateral force of the wind on the sail.

DISCLOSURE OF THE INVENTION

The present invention comprises an improved vehicle having a sail as well as pedal power for propulsion. The vehicle of the present invention comprises a bicycle frame supported by a front, steering wheel and a rear, drive wheel. The frame differs from the conventional triangular bicycle frame in that the frame of the vehicle provides a semi recumbent operating position. The vehicle is powered by a conventional foot pedal drive system similar to those in use with ordinary bicycles with the exception that each pedal assembly is positioned well ahead of the seat and only slightly lower than the seat. The front wheel is rotatably mounted on a front fork attached to a steerer tube which in turn is secured to a stem and handle bar assembly for the steering of the vehicle. To accommodate the operator's position, the stem and handlebar are extended upward and backward toward the operator. Similar configurations are referred to as "Compact Wheel Base" or "Compact Long Wheel Base" recumbent bicycles. In the preferred embodiment a tandem configuration is used with two operator seats with backs mounted in line on the frame. The seat for the steering operator, known as the captain is immediately behind the handlebars and the seat for the additional passenger known as the stoker is immediately behind the seat of the captain.

The vehicle has the usual equipment required for a bicycle. Accordingly, the vehicle has a chain driven rear drive wheel, the chain being operated by the pedaling action of the operators, providing a driving force to the drive wheel. The present vehicle has two pedal crank assemblies, each consisting of two foot pedals that are attached to opposing pedal cranks mounted on a shaft that extends through a bearing assembly. A timing chain connects a sprocket in the captain's pedal system to a sprocket in the stoker's pedal system and one or more multi-toothed sprockets, referred to as the chain rings, are mounted on the shaft of the stoker's pedal assembly. The chain rings are rotated when the stoker's pedal crank shaft is rotated by movement of either set of pedals. A chain transmits the rotational force applied to the chain rings to a set of toothed sprockets that are individually referred to as cogs and collectively referred to as the cogset. The cogset is mounted on the hub of the rear wheel by means of a freewheel such that forward propelling rotational force only is applied to the rear wheel. The chain rings are of different sizes, and the cogs are also different sizes. A conventional front derailleur serves to move the chain from one chain ring to another while a conventional rear derailleur serves to move the chain from one cog to another, thereby changing the mechanical advantage of the pedals relative to the rear, drive wheel. Similarly, conventional braking systems control the braking of the front and rear wheels and are controlled by cables mounted on the handle bars.

The frame is formed of a top tube and a bottom tube, generally parallel to each other and both running from a head tube a vertical cross brace between the top and bottom tubes at the rear end of the frame, the bottom of the frame being connected to a pair of horizontal chain stays that hold the axle of the rear, drive wheel. A pair of seat stays extend angularly downward from the top of the rear cross brace to join the chain stays and secure the rear hub. Several cross braces extend between the top and bottom tubes at various positions along the frame between the head tube and the rear vertical brace as required by the length of the frame to provide rigidity to the frame. The frame extends under and provides support for the captain and stoker seats and for the pedal crank assemblies. The handlebars are attached to a stem that is secured to an upwardly extending steerer tube from the front fork. The steerer tube is received within the head tube and supported by bearings within the head tube. The stem and handlebars extend in a rearward direction toward the captain seat so that the captain can steer while sitting with his back supported in a semi-reclined, recumbent, position. The captain and stoker seats are each supported by a support member that is secured to a sleeve mounted on the frame beam. The seat supports are slidable along the top tube for adjustability and can be fixed in position after adjustment.

The sail assembly comprises a mast mounted on the frame with a boom mounted on the mast and a main sail attached to the mast and boom in the conventional fashion, with the exception that the foot of the mainsail is attached to the boom by an outhaul that includes a quick release mechanism controlled by a lanyard led to a position within easy reach of the stoker. By pulling the quick release lanyard, the stoker can quickly release the mainsail as may be required by circumstances or strong gusts of wind that would otherwise threaten the stability of the vehicle. The main sail may be supplemented by a jib supported by a wire stay running from the mast head to a forestay extension member which extends forward past the steering tube of the handlebars. The mast is affixed in a vertical position supported by a tubular mast step located on the frame of the vehicle, immediately behind the captain's seat and in front of the stoker seat. At the same fore and aft position as the mast, two support wheels are mounted in a position laterally displaced from the center line of the frame, one on each side of the frame. Each lateral support wheel is free to rotate about a horizontal axle mounted in a forked frame that is connected to the vehicle by angled struts in front and behind that are angled from the lateral support wheel fork to the frame as well as a vertical strut angled downward to the lateral support wheel fork from the top of the mast step. Shock absorbing devices can be used as a part of the support wheels forks, provided the compressibility of the shock absorbers is not so great as to unduly compromise the righting moment of the support wheels. The angled lateral struts are attached to the bottom tube by frame mounted brackets with each attachment made by a horizontal clevis pin through holes in the bracket and through the end of the strut such that the struts are vertically pivotable about the clevis pin. Each lateral and top strut includes a spring mediated shock absorption apparatus. The shock absorption apparatus of the top struts is located at the lower end toward the support wheel hub. The lateral struts are straight except for a bend proximate to the frame juncture. Between the support wheel and the strut bend, the lateral struts extend slightly upward from the hub of the support wheels and between the bend and the frame the lateral struts extend slightly downward toward the bottom tube and at 90 degrees to the frame. The spring shock absorbers connect from the top tube of the frame to the top of the bend in the lateral struts. The compressibility of the shock absorption apparatuses of the struts is also not so great as to unduly compromise the righting moment of the support wheels.

The mast step is also braced by a strut that extends diagonally downward and forward from the top of the step to the top tube as well as the two lateral top struts that extend from the top of the step to the lateral support wheel axle assemblies. Side stays extend from the mast to the top of the support wheel forks and an optional forestay may be used from the top of the mast to a forestay extension attached to the frame and extending forward past the head tube. The mast is inserted into the mast step which comprises a tube shaped socket in which the mast fits snugly. The mast step is removably secured to the frame by front and rear braces on the top tube and lateral braces fixed to the mast step that extend downward on both sides of the top and bottom tubes and are clamped to the frame by toggle means. The mast is formed of telescoping sections and is thus reducible in height to avoid windage when not being deployed. The boom is formed of two telescoping sections, the smaller diameter, outer section fitting within the larger diameter inner section to reduce the length of the boom. The mast, boom, sail, and support wheels are removable to allow the vehicle to be operated by pedal power alone without the encumbrance of the unused equipment.

The control of the angle of the main sail relative to the axis of the vehicle is achieved by control of the rotational angle of the boom which is otherwise free to rotate about the mast. A preferred method of controlling the rotation of the boom is by a multi-part rope and pulley sheeting system coming from a mid-section or later section of the boom to the aft top of the seat stays and forward to the mast and down to a pulley on the mast step. The boom control sheet may be controlled by the stoker or the captain from the forward end at the mast step, and alternatively by the stoker from the rear end of the system from the seat stays.

The support wheels and the mast and sail assembly do not interfere with or prevent the use of the pedal drive system. Therefore, the vehicle can be powered by sail or pedal or both simultaneously. The vehicle is fully functional as a tandem bicycle, and the mast and sail assembly and the support wheels and the support wheel struts can be removed as the operator may desire.

The principal aim of the present invention is to provide a new and improved vehicle which meets the foregoing requirements and which is capable of being powered by the wind and by the pedaling of the operator, concurrently or alternatively.

Another and further object and aim of the present invention is to provide a new and improved vehicle which meets the foregoing requirements and which is capable of operable by one of two persons.

Yet another and further object and aim of the present invention is to provide a new and improved vehicle which meets the foregoing requirements and which is economical to operate, manufacture and maintain.

Other objects and advantages of the invention will become apparent from the Description of the Preferred Embodiment and the Drawings and will be in part pointed out in more detail hereinafter.

The invention consists in the features of construction, combination of elements and arrangement of parts exemplified in the construction hereinafter described and the scope of the invention will be indicated in the appended claims.

BRIEF DESCRIPTION OF THE DRAWINGS

FIG. 5A is a side view of the mast of a preferred embodiment of the present invention.

FIG. 5B is a partial front view showing the mast step of a preferred embodiment of the present invention.

FIG. 5C is a partial side view showing a part of the boom, mast step, and frame of a preferred embodiment of the present invention.

BEST MODE FOR CARRYING OUT THE INVENTION

Figure 1:
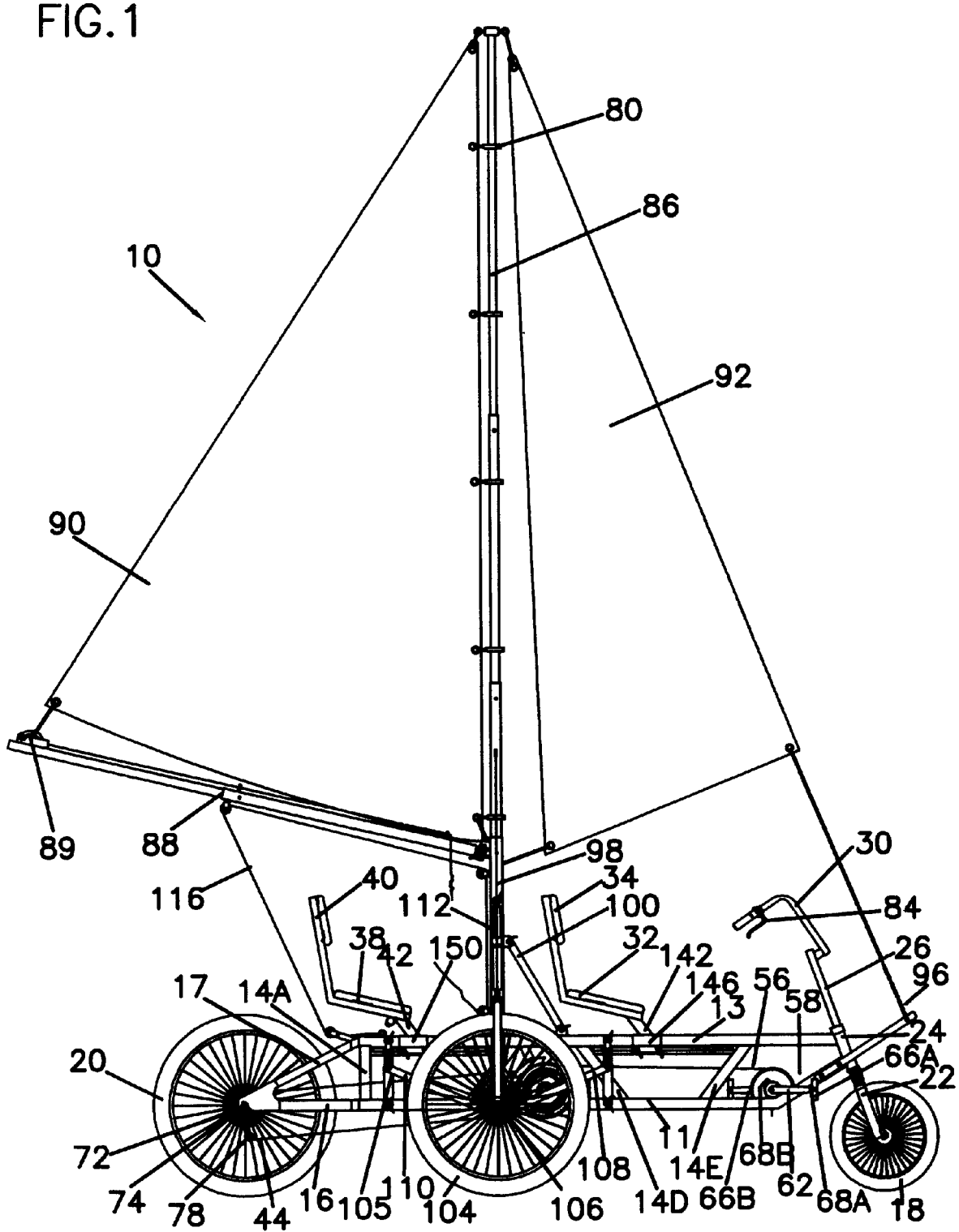
FIG. 1 is a side view of a preferred embodiment of the invention showing the vehicle of the present invention.
Figure 2:
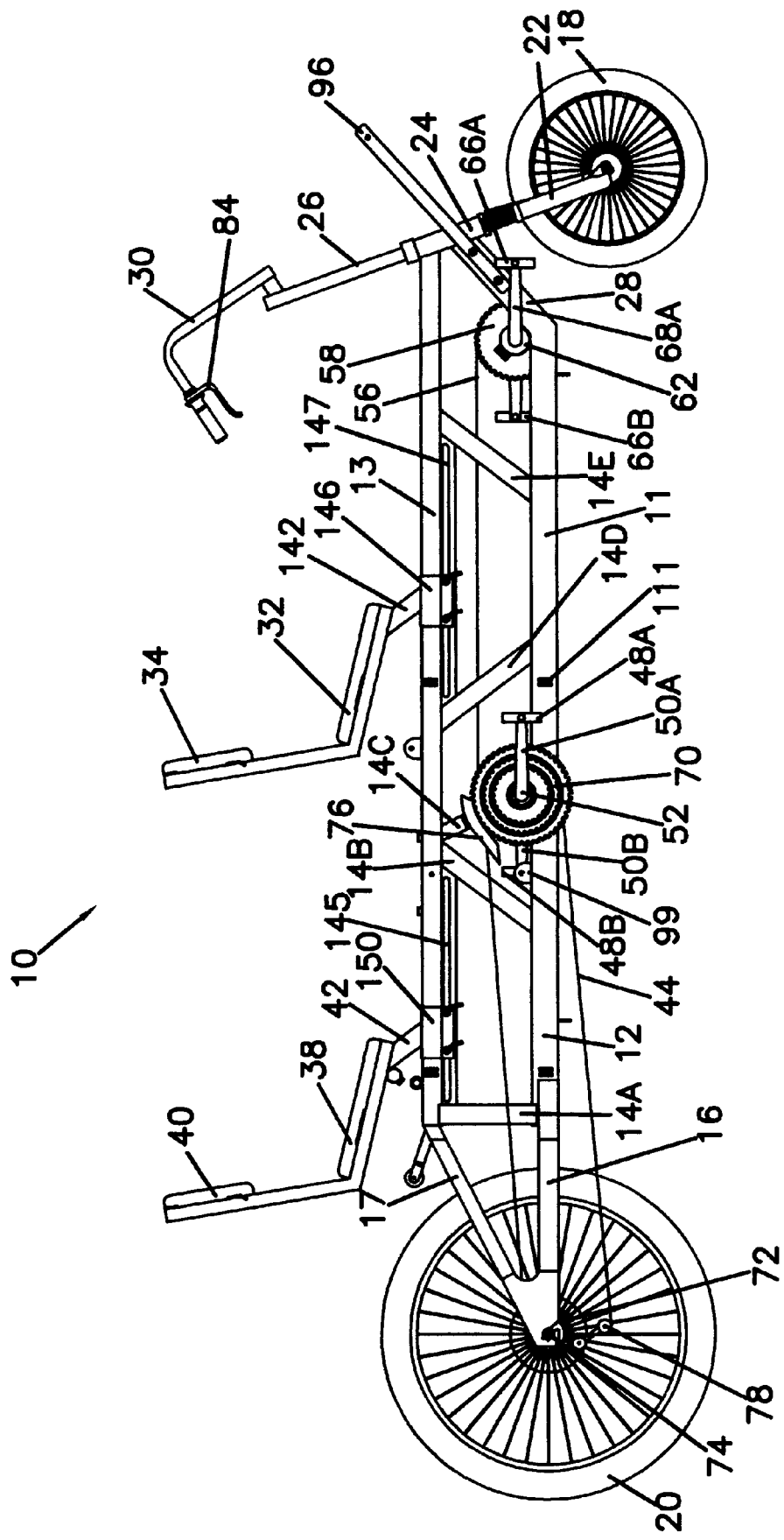
FIG. 2 is a side view of a preferred embodiment of the vehicle of the present invention showing the vehicle with the mast, sail, support wheels and supporting struts removed.
Figure 3:
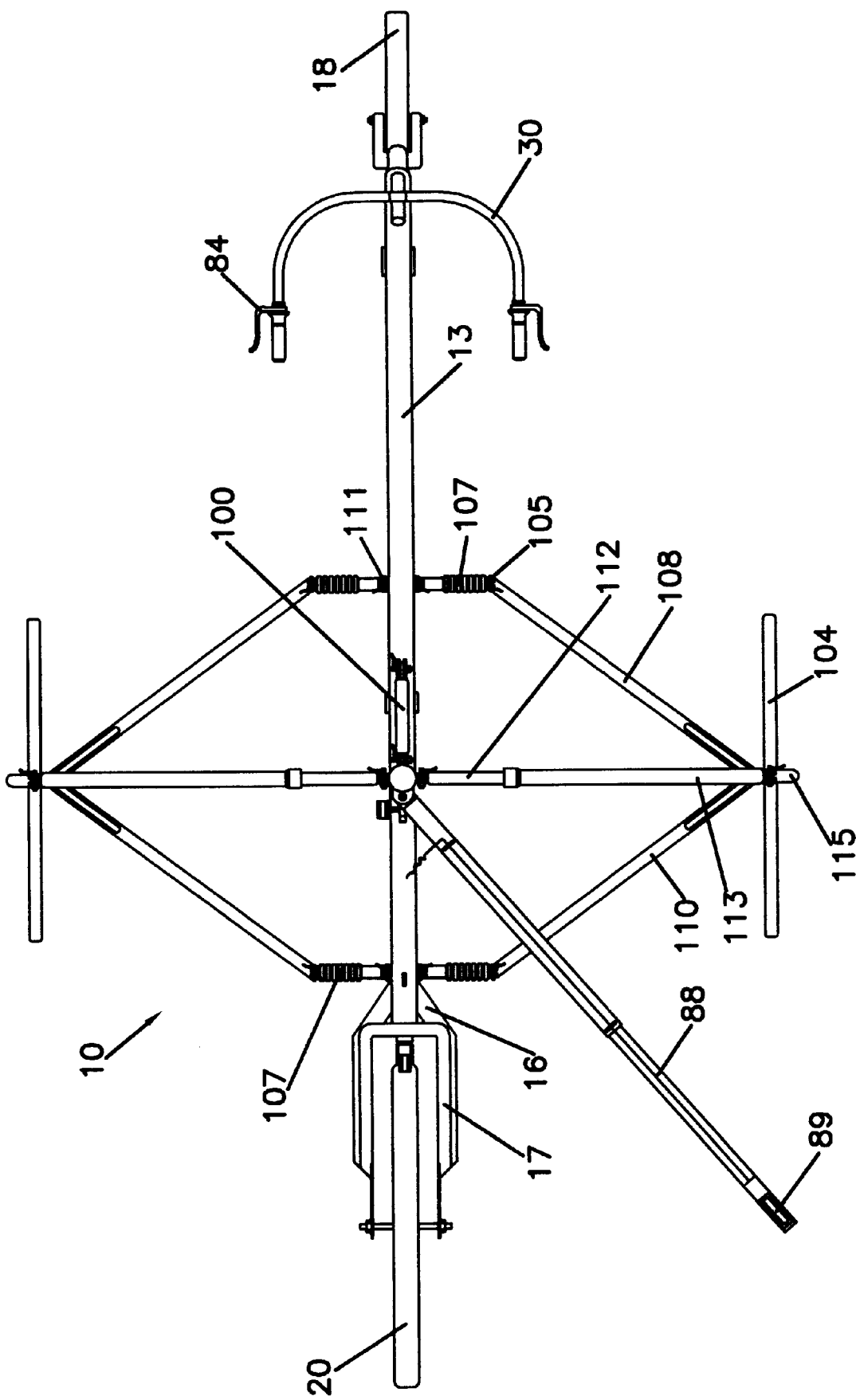
FIG. 3 is a top view of a preferred embodiment of the present invention including the mast, boom, frame, and lateral and top support struts.
Figure 4:
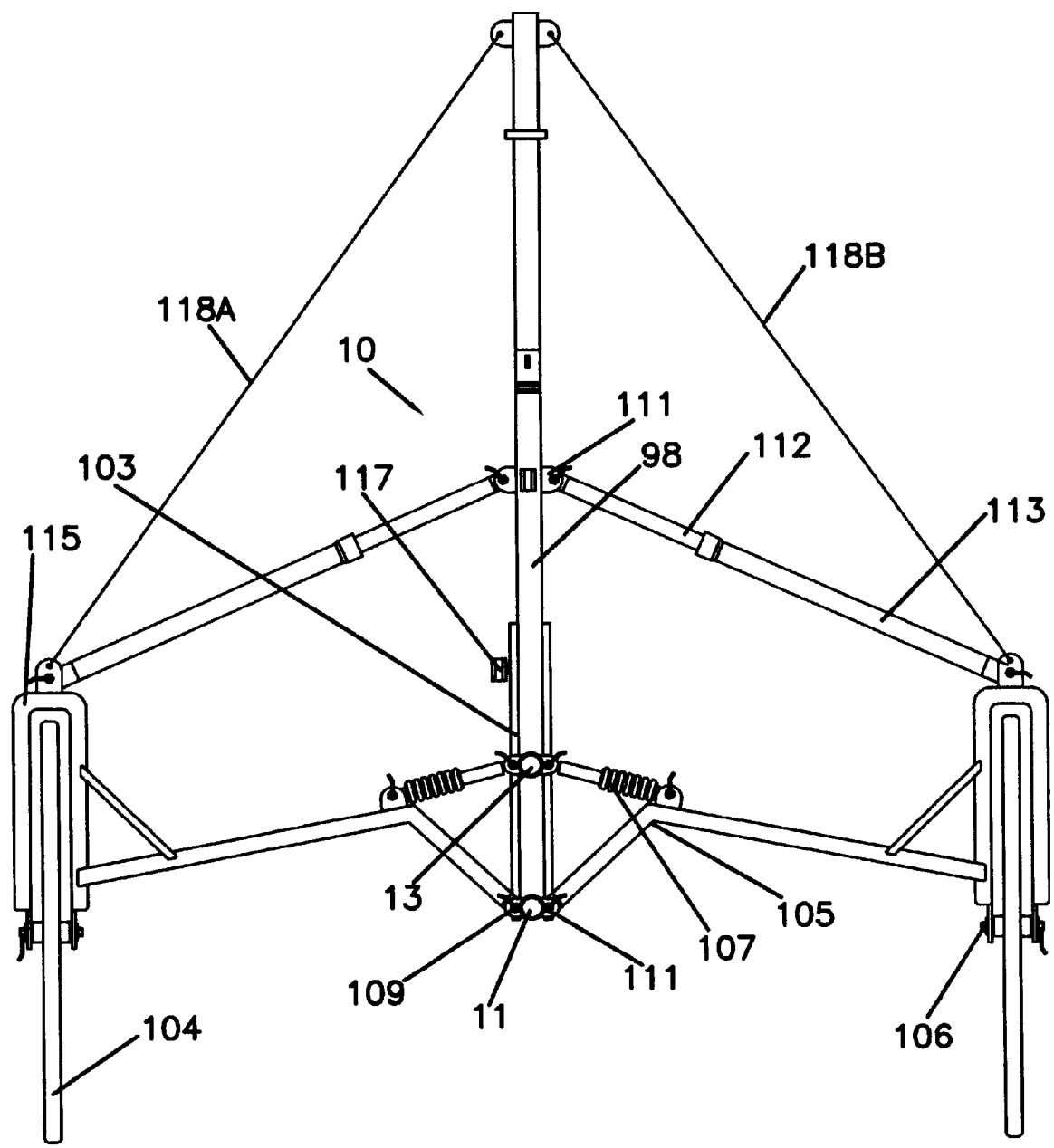
FIG. 4 is a partial rear view of a part of a preferred embodiment of the present invention including the mast step, top and lateral struts, support wheels, and a section of the frame.

With reference to the Drawings wherein like numerals represent like parts throughout the Figures, the best mode of a vehicle in accordance with the present invention is generally designated by numeral 10 in FIGS. 1 and 2.

Frame 12 of vehicle 10 of the present invention comprises a straight bottom tube 11 extending from a point of attachment of a front pedal assembly, rearward to rear wheel chain stays 16 and a straight top tube 13 extending from head tube 24 to rear seat stays 17. As is seen in FIG. 2, frame 12 comprises five bracing tubes 14 extending between the top tube 13 and the bottom tube 11, serving to strengthen and rigidify frame 12. Bracing tube 14A vertically connects the rear ends of the top tube 13 and the bottom tube 11, while bracing tube 14B connects top tube 13 and bottom tube 11 at an acute angle with respect to bottom tube 11, bracing tube 14C connects at an obtuse angle, bracing tube 14D connects at an obtuse acute angle and bracing tube 14E connects at an acute angle. Vehicle 10 is supported by a front, steering wheel 18 and a rear, drive wheel 20. The front wheel 18 is mounted on a front fork 22 from which a steerer tube (not shown) extends upward through a head tube 24 to be secured to a handlebar stem 26. The top of head tube 24 is attached to the forward end of top tube 13 and the bottom of head tube 24 is attached to bottom tube 11 by a short, upwardly angled section 28, and is angled upward and backward at an angle of about 40 to 50 degrees from the frame 12. A handle bar assembly 30 is securely clamped to the stem 26 to provide for the steering of vehicle 10. The steerer tube is received within the head tube 24 and supported by bearings (not shown) so as to be free to rotate within the head tube 24, thereby turning front wheel 18 for steering vehicle 10.

A captain's operator seat 32 with a back 34 is mounted in line with and on the top tube 13 and is vertically separated from, and supported on top tube 13 by a seat support member 142 that is secured to a sleeve 146 slidingly mounted on the top tube 13. Sleeve 146 is formed of two halves that surround the top tube 13 and are joined by a hinge at the top and by a quick release clamp at the bottom, to allow sleeve 146 to releaseably clamp to top tube 13. In the area of usual attachment of sleeve 146, top tube 13 includes a vertical track 147 along the bottom of top tube 13, the purpose of which track 147 is to provide additional means to prevent the rotation of sleeve 146 and the seat assembly about top tube 13. The position of seat support 142 along top tube 13 is adjustable and can be fixed after adjustment. Captain seat 32 is located behind the handlebars 30. A stoker's operator seat 38 with a back 40 is mounted in line with and on the top tube 13 and is supported on top tube 13 by a seat support 42 that is secured to a sleeve 150 slidingly mounted on the top tube 13. Sleeve 150 is similar to sleeve 146 and is similarly prevented from rotating on top tube 13 by a track 145 along the bottom of top tube 13. The position of seat support sleeve 150 along top tube 13 is adjustable and can be fixed after adjustment. Stoker seat 38 is located behind captain's seat 32 and may include a hand rest. Vehicle 10 includes a conventional foot pedal drive system similar to those in use with ordinary tandem bicycles. Vehicle 10 has a drive chain 44 connecting rear wheel 20 to a rear pedal assembly consisting of two foot pedals 48A and 48B that are attached to opposing pedal cranks 50A and 50B mounted on a rear pedal crank shaft 52 that extends between pedal cranks 50A and 50B. A timing chain 56 connects a first sprocket 58 to a second sprocket (not shown in the Figures) that is mounted on crank shaft 52 of rear pedal assembly on the left side of frame 12. First sprocket 58 is mounted on the left side of a front pedal crank shaft 62 of the front, captain pedal assembly consisting of two foot pedals 66A and 66B that are attached to opposing pedal cranks 68A and 68B mounted on opposite ends of shaft 62. Rear pedal assembly includes one or more chainrings 70 that are toothed sprockets mounted on pedal crank shaft 52 and that receive drive chain 44. Drive chain 44 transmits the rotational force applied to the chain rings 70 to a set of toothed cogs 72 that are mounted on the hub 74 of the rear wheel 20 by means of a freewheel. The chain rings 70 are of different sizes, and the cogs 72 are also different sizes. A conventional front derailleur 76 serves to move drive chain 44 from one chain ring 70 to another while a conventional rear derailleur 78 serves to move the drive chain 44 from one cog 72 to another. Rear pedal assembly is mounted on or through frame 12 well in front of stoker seat 38. Front pedal assembly is similarly mounted on or through frame 12 well in front of captain seat 32. Both seats 32 and 38 are mounted above the central frame 12 with a vertical height relative to the pedal assemblies that is less than that of a conventional bicycle. The height of the seats 32 and 38 are adjustable and is determined to allow comfortable reach to the pedal assemblies while in a recumbent or semi recumbent position. Although variable by adjustment of seat height and the position of the seat along the top tube 13, a typical configuration is such that the angle between the frame 12 and lines from the front edge of seat 32 to the pedal crank shaft 62, and from the front edge of seat 38 to the pedal crank shaft 52 is from about 40 degrees to about 50 degrees. A conventional braking system which may include disc brakes provides for the braking of the front and rear wheels 18 and 20 and is controlled by brake levers 84 mounted on handlebar 30. With the equipment thus far described, the vehicle 10 is fully functional as a tandem bicycle as is shown in FIG. 2.

Vehicle 10 is further equipped with a removable sail assembly comprising a mast 86 mounted on the frame 12 with a boom 88 mounted on the mast 86 and a main sail 90 attached to the mast 86 and boom 88 by hoops 80, or other conventional means. The main sail 90 may be supplemented by a jib 92 running from the top of mast 86 to the end of a forestay extension member 96 which extends forward past the head tube 24. Mast 86 is optionally stayed by an optional forestay (not shown) which may run from the top of mast 86 to the forestay extension member 96. Mast 86 is telescoping and formed of sections 86A, 86B, and 86C which are of decreasing diameter to fit within each other such that mast 86 is reducible in height to avoid windage when not being deployed. Mast 86 is removably supported in a vertical position by a mast step 98 mounted on and normal to horizontal frame 12 of vehicle 10, immediately behind the captain seat back 34 and in front of the stoker seat 38, at about the same position as the rear pedal assembly. Mast step 98 comprises a tube shaped socket in which the bottom mast section 86C fits snugly. Mast step 98 is supported by a front mast step strut 100 which extends diagonally downward from the top of mast step 98 to top tube 13 and forward and rear mast step braces 102A and 102B, both of which extend diagonally from the mast step 98 to top tube 13. Mast step 98, front mast step strut 100 and forward and rear mast step braces 102a and 102B are removably attached to frame 12. Two lateral mast step braces 103 are formed as straight rigid straps extending downward from the sides of mast step 98 to securely engage both top tube 13 and bottom tube 11. A top clamping bolt 101 extends through both braces 103 and through the top tube between braces 103 and a bottom clamping bolt 97 extends through both braces 103 and through a bracket 99 on the top of bottom tube 11 between braces 103 to clamp the mast step 98 securely to frame 12. Two support wheels 104 are mounted in a position laterally displaced from the center line of frame 12, one on each side. Each lateral support wheel 104 is free to rotate about a horizontal axle 106 which is supported by a support fork 115 that extends vertically upward from both sides of axle 106 and across the width of wheel 104. Support wheel forks 115 are connected to the vehicle frame 12 by three angled struts, a front strut 108 diagonally extending from support wheel fork 115 to frame 12 at a location forward of mast step 98, a rear strut 110 diagonally extending from support wheel fork 115 to frame 12 at a location behind mast step 98, and a top strut 112 extending from the top of support wheel fork 115 to the top of mast step 98. Both front and rear struts 108 and 110 are removably attached to frame 12 and top strut 112 is similarly removably attached to mast step 98. Both mast step 98 and support wheels 104 and supporting struts 108, 110, and 112 can be removed from vehicle 10 to facilitate operation of vehicle 10 strictly as a bicycle if desired, as shown in FIG. 2. Each lateral support wheel fork 115 is constructed and each lateral support wheel 104 is sized such that all four wheels normally touch the ground unless the vehicle 10 is tilted to one side. Both the front and rear struts 110 and 108 are directly attached to the bottom tube 11 by a horizontal clevis pin 109 within a bottom tube mounted bracket 111 and are vertically pivotable about the clevis pin 109 and are also connected to the top tube 13 by means of a spring shock absorption mechanism 107. The front and rear struts 108 and 110 are straight except for a bend 105. From hub toward bend 105, the struts 108 and 110 extend slightly upward and from bend 105 toward the bottom tube 11 the struts 108 and 110 extend slightly downward and at 90 degrees to the frame 12. Spring shock absorbers 107 connect from the top tube 13 to the top of the bends 105. Each top strut 112 is pivotably attached to mast step 98 and to the support wheel forks 115 by brackets and clevis pins so as to be vertically pivotable in the plane normal to the frame 12 and comprises a spring shock absorption mechanism 113. Side stays 118A and 118B extend from the mast 86 to the tops of support wheel forks 115 to limit the maximum displacement of the mast from the support wheels.

The control of main sail 92 is achieved by control of the rotational angle of boom 88 relative to the center line of vehicle 10. The preferred means for controlling boom 88 comprises a multipart rope and pulley sheeting system between boom 88 and the top of seat stays 17. The sheet of boom control system 116 is led forward to the mast 86 and down to a pulley 117 on the mast step 98. The boom control sheet may be controlled by either the stoker or the captain from the forward end from the mast step pulley 117 or by the stoker from the rear end of the system from the seat stays 17. The foot of the mainsail 90 is secured to the outer end of boom 88 by means of a quick release attachment 89 that is controlled by a lanyard lead forward on boom 88 to a position at which it can be easily and quickly operated by the stoker to release the foot of main sail 90 as may be desired to prevent accidents caused by gusts of wind.

It will further be appreciated and anticipated that shock absorbing devices can be used as a part of the support wheel forks 115. Any such shock absorption adaptation should not unduly compromise the righting moment of the support wheels 104. In addition, other forms of shock absorbing mechanisms may be utilized without departing from the invention.

It should further be appreciated and anticipated that while the frame of vehicle 10 has been fabricated of steel, a variety of materials could be used with satisfactory, but different results, including, aluminum, thermoset and fiber reinforced resin or plastic, as well as ceramic-metal composites.

It should be further appreciated and anticipated that while vehicle 10 has been designed as a tandem bicycle, it is operable by a single operator, and that with the elimination of one set of pedals and the timing chain, and a seat, a single passenger configuration can be achieved. It is to be expected that the benefits of vehicle 10 can be enjoyed in a single passenger configuration, although the illustrated tandem version is preferred.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

INDUSTRIAL APPLICABILITY

The vehicle 10 of the present invention may be used as a sail powered vehicle when the mast step 98, mast 86, boom 88, sails 90 and 92, and lateral support wheels 104 are installed, or as a recumbent tandem bicycle when said components are removed. Use as a sail powered vehicle follows the usual methods of operating a sail powered boat with the exception that if the vehicle is tipped to one side, it may be necessary to counter steer to maintain a straight course. The operators may use pedal power to augment the sail power as desired.

Further, it is noted that the vehicle may be operated as a bicycle without removing the lateral support wheels 104 which would then serve to provide lateral support for the operators.

What is claimed is:

1. A wind and pedal driven land vehicle comprising a frame, a front steering wheel and a rear drive wheel, both wheels attached to and supporting the frame, pedal means supported by the frame for transmitting power to the drive wheel, sail means supported by the frame for propelling the vehicle by interaction with wind, and two wheels aligned parallel to, and laterally displaced from, the frame, with one lateral support wheel on each side of the frame, each lateral support wheel is supported within a fork assembly and each fork assembly is removably attached to the frame by a forwardly extending strut and a rearwardly extending strut, the attachment of the forward and rearward support wheel struts to the vehicle frame comprises shock absorbing means providing limited and dampened vertical movement of the support wheels.

2. The vehicle of claim 1, wherein the sail means comprises a mast attached to the frame and extending upwardly therefrom, a boom pivotably attached to the mast, a sail attached to and between the mast and the boom, and means for controllably varying the angle of the boom relative to the vehicle frame.

3. The vehicle of claim 2, further comprising at least two operator seats mounted on the frame in line between the front and rear wheels with one seat between the front wheel and the mast and at least one seat between the rear wheel and the mast.

4. The vehicle of claim 3, wherein each operator seat comprises a seat back and is sufficiently rearwardly displaced from the pedal means to allow the operator to assume a recumbent position while pedaling the vehicle.

5. The vehicle of claim 4, further comprising a tubular mast step removably secured to the vehicle frame, having an inner dimension adequate for snugly receiving a lower portion of the mast and a lateral support strut extending from each support wheel fork to a connection point on the mast step higher than the support wheel forks.

6. The vehicle of claim 5, wherein the angle included between the frame and the line between the center of the each pedal means to the operator seat immediately behind the pedal means is from about 40 degrees to about 50 degrees.

7. The vehicle of claim 6, further comprising means for quickly releasing the attachment of the sail to the boom.

8. The vehicle of claim 7, wherein the mast comprises telescoping sections and is supported by two side stays, each stay extending from the mast to the top of one of the support wheel forks.

9. The vehicle of claim 8, wherein the lateral support struts comprise a shock absorption mechanism.

10. A wind and pedal driven land vehicle comprising a frame, a front steering wheel and a rear drive wheel, both wheels attached to and supporting the frame, at least two operator seats mounted on the frame in line between the front and rear wheels, pedal means supported on the frame for transmitting power to the drive wheel, sail means supported on the frame for propelling the vehicle by interaction with wind, and two wheels aligned parallel to, and laterally displaced from, the frame, for providing lateral support of the vehicle with one lateral support wheel on each side of the frame, each lateral support wheel supported within a fork assembly and each fork assembly is removably attached to the frame by a forwardly extending strut and a rearwardly extending strut and the attachment of the forward and rearward support wheel struts to the vehicle frame comprises shock absorbing means providing limited and dampened vertical movement of the support wheels.

11. The vehicle of claim 10, wherein the sail means comprises a mast attached to the frame between the two operator seats and extending upwardly therefrom, a boom flexibly attached to the mast, a sail attached to and between the mast and the boom, and means for controllably varying the angle of the boom relative to the vehicle frame.

12. The vehicle of claim 11, wherein each operator seat comprises a seat back and is sufficiently rearwardly displaced from the pedal means to allow the operator to assume a recumbent position while pedaling the vehicle.

13. The vehicle of claim 12, further comprising a tubular mast step removably secured to the vehicle frame, having an inner dimension adequate for snugly receiving a lower portion of the mast and two lateral support struts, each comprising a shock absorption mechanism and extending from a support wheel fork to a connection point on the mast step higher than the support wheel forks.

14. The vehicle of claim 13, wherein the angle included between the frame and the line between the center of the each pedal means to the operator seat immediately behind the pedal means is from about 40 degrees to about 50 degrees.

15. The vehicle of claim 14, further comprising means for quickly releasing the attachment of the sail to the boom.

16. The vehicle of claim 15 wherein the mast comprises telescoping sections and is supported by two side stays, each stay extending from the mast to the top of one of the support wheel forks.

* * * * *